United States Patent
Green

[11] 3,731,274
[45] May 1, 1973

[54] GUIDING LIGHT SYSTEM FOR TRAILER TOW CAR HOOK-UP

[76] Inventor: Laurence Green, P.O. Box 1127, Twin Falls, Idaho

[22] Filed: Sept. 20, 1971

[21] Appl. No.: 182,017

[52] U.S. Cl.................340/52 R, 180/103, 340/282
[51] Int. Cl. .............................................B60q 1/00
[58] Field of Search............................340/52 R, 282; 180/103

[56] References Cited

UNITED STATES PATENTS

| | | | |
|---|---|---|---|
| 2,736,885 | 2/1956 | Thompson | 340/52 R |
| 3,418,628 | 12/1968 | Fenner | 340/52 R |

Primary Examiner—Thomas B. Habecker
Assistant Examiner—Glen R. Swann, III
Attorney—Wells, St. John & Roberts

[57] ABSTRACT

This apparatus embodies equipment to produce in front of the driver of a tow car two signal devices in the form of lamps which show the driver of the car whether or not it is backing directly toward the hook-up position to attach a trailer coupling when it is close to this position and when it reaches hook-up position. The signal devices are right-hand and left-hand lamps, mounted on the dash or the instrument panel of the car. At the rear end of the car two spring contactors are mounted on the car side by side. A cable passes between the contactors and is wound on a spring take-up reel that is spaced in front of the spring contactors on the car. The cable is an electricity conductor and has means, insulated from the cable at its free end to attach it to the trailer coupling. The lamps each have one terminal connected to the ungrounded side of the car battery and the other terminal connected to one of the spring contactors so that so long as the cable engages both contactors there is a circuit completed from the battery through each lamp then through its conductor to the spring contactor, then through the cable to ground and the grounded side of the battery. If the cable pushes either contactor away from the other one then the lamp connected to the other one has its circuit broken, and shows dark to the driver. The cable has an insulation, covering it adjacent to its free end to darken both lamps when the car is in close proximity to hook-up position.

4 Claims, 5 Drawing Figures

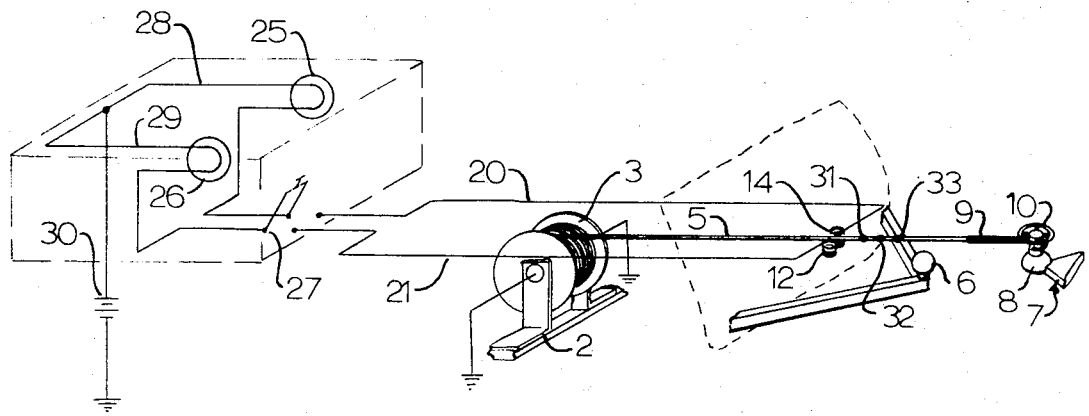
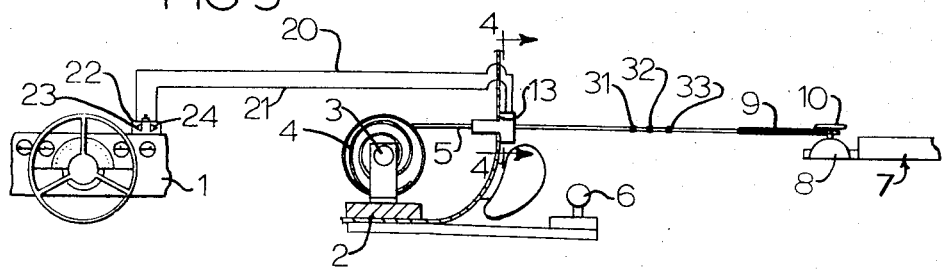
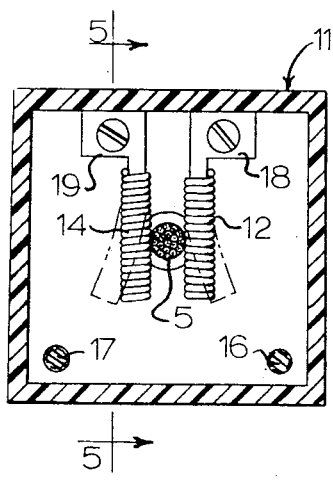
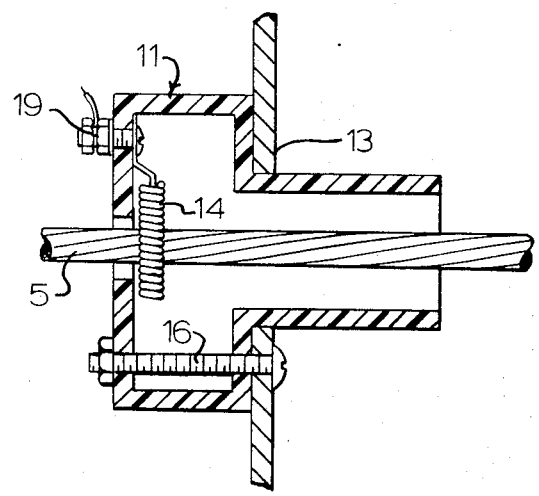

GUIDING LIGHT SYSTEM FOR TRAILER TOW CAR HOOK-UP

BACKGROUND OF THE INVENTION

A search of the prior patents in this field revealed the following prior U. S. Pat. Nos. for the guiding of a tow car into hook-up position in front of a trailer:

Thompson 2,736,885
Tamis et al. 2,797,406
Knapp 2,927,310
Sparks et al. 3,237,177
Fenner 3,418,628

The Thompson patent uses a cable which turns on an arm to cause a flexible shaft on the trailer to swing a rocker arm on the trailer to right or left. A switch on the first mentioned arm is actuated by bumping a stop on the tow car and lights a lamp on the trailer. In the Tamis et al. patent the tow car carries a series of contact pairs which can be bumped by the tip of the tongue on the trailer to light various lamps on the dash of the tow car and indicate whether the ball on the tow car is aligned with the socket on the trailer tongue. The Knapp patent uses two telescoping feelers to actuate indicators in the tow car that indicate lack of alignment of the longitudinal center line of the trailer with the tow car. The Sparks et al. patent shows a coupling bar to control a dash indicator of right or left deviation of the trailer. The Fenner patent has an upstanding post on the trailer tongue to carry a series of lamps. These lamps are lighted by the tow car ball hitting one of a series of flaps on the trailer tongue to operate a switch.

SUMMARY OF THE INVENTION

The purpose of this invention is to provide means to direct the driver of a tow car in backing it into hook-up position of its coupling unit with respect to the coupling unit on the trailer, wherein two signal devices in front of the driver are actuated by making and breaking contact between a spring retracted cable that is mounted on the tow car to extend rearwardly along the center line of the tow car through the rear end of the car and to the coupling unit on the trailer, and a pair of spring mounted electrical contactors arranged side by side, on the rear end of the tow car so that the cable, when taut between its mounting on the tow car and the coupling unit on the trailer can contact both contactors, or either contactor depending upon whether the tow car is backing correctly or veering to right or left with respect to the hook-up coupling on the trailer.

It is also a purpose of this invention to provide a cable, in the foregoing assembly with insulation thereon to engage the contactors and temporarily change the signal of the signal device as an indication of the proximity of the tow car to hook-up position.

BRIEF DESCRIPTION OF THE DRAWINGS

In the drawings:

FIG. 2 is a wiring diagram illustrating the electrical connections in the device;

FIG. 3 is a detailed view partly in section showing the relative positions of the tow car-trailer couplings and the cable;

FIG. 4 is an enlarged sectional view on the line 4—4 of FIG. 3; and

FIG. 5 is a sectional view on the line 5—5 of FIG. 4.

DESCRIPTION OF THE PREFERRED EMBODIMENT

Figure 1:
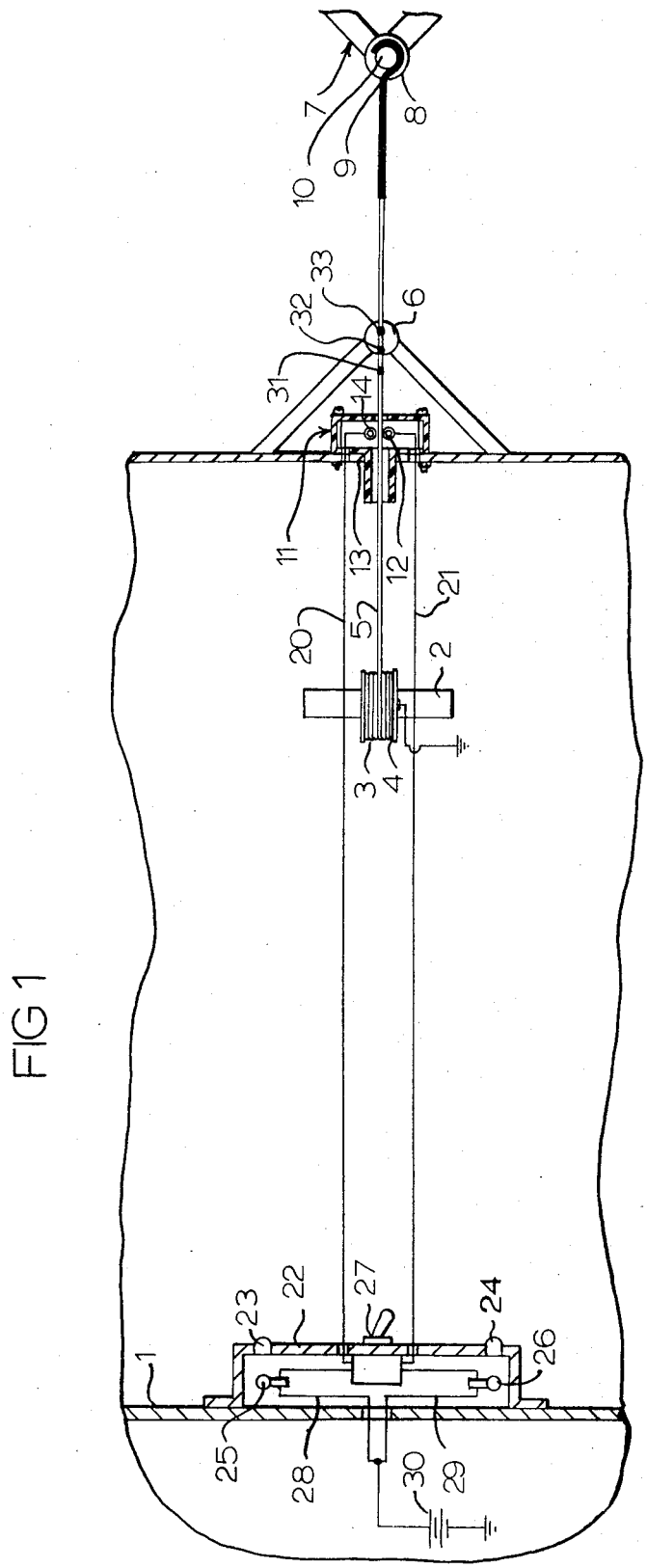
FIG. 1 is a somewhat schematic plan sectional view of a tow car and a trailer to which my invention is applied showing the relative positions of the parts.

Referring now in detail to the drawings the tow car dash is indicated generally by the numeral 1. A portion of the frame of the car at 2 carries a reel 3 which is provided with a spring 4 to wind up a cable 5 thereon. This cable is an electrical conductor and is grounded through the reel 3 to the car. The tow car has a coupling unit 6 for connection to a complementary coupling unit 8 on a trailer 7. The coupling units 6 and 8 are shown as conventional ball and socket members respectively. The cable 5 may be drawn from the reel 3 rearwardly and carries a hook 9 to engage a post 10 on the coupling unit 8. There may be several feet of cable between the tow car unit 6 and the unit 8 on the trailer. By aligning the tow car center line with the cable. The tow car can be backed directly under the socket on the trailer tongue.

The cable 5 extends from the reel 3 through a casing 11 of insulating material which is mounted on the back end of the tow car at 13. Inside this casing there are two electrical contactors 12 and 14 side by side. These contactors are coiled springs of stainless steel and they are spaced apart slightly to engage the cable 5 as shown in FIG. 4. The cable if moved to right or left pushes one contactor and moves away from the other to break contact with it. The casing 11 is mounted to the tow car by two bolts 16 and 17. The contactors 12 and 14 are carried on wiring terminals 18 and 19 which are mounted on the casing 11.

The terminals 18 and 19 are attached to insulated conductors 20 and 21, which extend forward to another casing 22, mounted on the tow car dash 1 in front of the driver. This casing has two apertures 23 and 24 therein and inside the casing are two small lamps 25 and 26 which provide signals to indicate when the cable 5 is in engagement with only one of the contactors 12 or 14 or is engaged with both and completing a circuit. The conductors 20 and 21 extend to a manually operated switch 27 which, when closed, completes connection of the conductors 20 and 21 to one terminal of each of the lamps 25 and 26. Conductors 28 and 29 connect the other lamp terminals to the battery 30 of the tow car. Thus, when the switch 27 is closed the engagement of the cable 5 with a contactor 12 or 14 completes an energizing circuit for the corresponding signal 25 or 26.

The cable 5 has means thereon to effectively inform the driver of the tow car when the coupling units are getting close to each other. This is done by applying a plurality of coverings of insulation to the cable a few inches from the free end of the cable. These coverings are shown in FIG. 1 at 31, 32 and 33. When one of the coverings gets between the contactors 12 and 14 both signals 25 and 26 go dark. So these three warnings alert the driver. Then the fastening means 9 on the end of the cable is a hook made of a plastic which is an insulator. When the contactors 12 and 14 engage this hook the unit 6 on the tow car is directly under the coupling unit 8 on the trailer and both signal lamps are de-energized.

The operation of this device is as follows. The driver of the tow car brings it close enough to the trailer, with its rear end toward the trailer, that the cable 5 can be pulled out against the force of the spring 4 until the cable is fastened to the coupling unit 8 on the trailer. The driver then backs the tow car under the guidance of the two signal lamps so as to keep the cable 5 in contact with both contactors 12 and 14. When the first insulation covering 31 on the cable passes between the contactors the driver knows that the coupling unit 6 is in close proximity to the coupling unit 8 on the trailer. He proceeds cautiously until the fastening means 34 is between the contactors 12 and 14 sufficiently to again break the energizing circuit for both signal devices 25 and 26. This indicates that the coupling units are in hook-up position.

The invention upon which a patent is requested is defined in the following claims.

I claim:

1. In a tow car having on its rear end a central coupling unit connectable to a complementary coupling unit on the front of a trailer vehicle, apparatus on the tow car operable to signal the tow car driver to guide his backing of the tow car to bring its coupling unit into position to hook up to the trailer coupling unit, said apparatus comprising:

an electrically conductive cable operatively connected to a first terminal of a source of electrical current and having one end mounted in the tow car forwardly of and in alignment longitudinally of the car with the tow car coupling unit;

a pair of side-by-side electrical contactors with means supporting and insulating them on the tow car in alignment with and between the tow car coupling unit and the mounted end of the cable;

said contactors being mounted to yieldingly oppose separation and being each engageable with the cable therebetween;

spring means in the mounting of the cable end to the tow car urging the cable forwardly between the contactors;

said cable having means at its free end attachable to the trailer coupling unit;

signal means mountable in the tow car connecting each contactor to the remaining terminal of the source of electrical current; and surface insulation on the cable adjacent to its free end operable to insulate the cable from the contactors when engaged by the contactors.

2. The invention defined in claim 1 wherein the means at the free end of the cable for attaching the cable to the trailer coupling unit comprises surface insulation material operable to insulate it from the contactors when engaged by the contactors.

3. The invention defined in claim 1 wherein the contactors comprise coiled springs side-by-side and a casing of insulation in which said springs are supported in upright positions, said casing having means to mount it on the tow car.

4. The invention defined in claim 1 wherein the signal means comprises a pair of lamps, a casing in which said lamps are mounted, said casing having laterally spaced windows, one for each lamp; and means to secure the casing on the tow car dash.

* * * * *